US 8,925,293 B2

(12) United States Patent
Mikula et al.

(10) Patent No.: US 8,925,293 B2
(45) Date of Patent: Jan. 6, 2015

(54) ADJUSTABLE HANDLE FOR OUTDOOR POWER EQUIPMENT

(71) Applicant: Ariens Company, Brillion, WI (US)

(72) Inventors: Derek Mikula, Appleton, WI (US);
Robert Endter, Reedsville, WI (US);
Brian J. Witt, Brillion, WI (US)

(73) Assignee: Ariens Company, Brillion, WI (US)

( * ) Notice: Subject to any disclaimer, the term of this patent is extended or adjusted under 35 U.S.C. 154(b) by 130 days.

(21) Appl. No.: 13/888,410

(22) Filed: May 7, 2013

(65) Prior Publication Data

US 2014/0331809 A1 Nov. 13, 2014

(51) Int. Cl.
*A01D 69/10* (2006.01)
*A01D 34/63* (2006.01)
*G05G 1/04* (2006.01)

(52) U.S. Cl.
CPC ........................ *G05G 1/04* (2013.01)
USPC ....................................................... 56/16.7

(58) Field of Classification Search
USPC ......... 56/10.1, 10.2 R, 10.3, 10.8, 11.3, 16.7, 56/10.5, 17.5; 172/351, 361, 364; 16/437, 16/438, 430, 445, 436; 280/655.1, 655, 280/652, 47.27, 47.26, 651, 47.371, 47.36
See application file for complete search history.

(56) References Cited

U.S. PATENT DOCUMENTS

| | | |
|---|---|---|
| 1,899,564 A | 2/1933 | Frey |
| 2,966,365 A | 12/1960 | Kortum |
| 3,702,016 A | 11/1972 | Keese |
| 3,795,933 A | 3/1974 | Seufert |
| 3,816,873 A | 6/1974 | Thorud et al. |
| 3,823,474 A | 7/1974 | Ionescu |
| 3,930,630 A | 1/1976 | Wulff |
| 3,998,476 A | 12/1976 | Kazmark, Sr. |
| 4,073,499 A | 2/1978 | Damone |
| 4,266,319 A | 5/1981 | Mason |
| 4,392,538 A | 7/1983 | Goertzen |
| 4,561,239 A | 12/1985 | Cook |
| 4,591,183 A | 5/1986 | Gordon et al. |
| 4,603,478 A * | 8/1986 | Anderson ................ 30/276 |
| 4,738,084 A | 4/1988 | Ogano et al. |
| 4,753,062 A * | 6/1988 | Roelle ................ 56/10.5 |
| 5,414,895 A | 5/1995 | Kazmark, Jr. |
| 5,438,731 A | 8/1995 | Kazmark, Jr. |
| D364,022 S | 11/1995 | Kazmark, Jr. |
| 5,499,426 A | 3/1996 | Hsieh |
| 5,535,483 A | 7/1996 | Cabagnero |
| 5,590,891 A | 1/1997 | Kazmark, Jr. |

(Continued)

FOREIGN PATENT DOCUMENTS

| | | |
|---|---|---|
| EP | 1452085 | 9/2004 |
| JP | 63159181 | 7/1988 |

*Primary Examiner* — Robert Pezzuto
(74) *Attorney, Agent, or Firm* — Michael Best & Friedrich LLP

(57) ABSTRACT

A walk-behind outdoor power machine includes a control that is actuable to control at least one operational aspect the power machine, a handle including a user-graspable portion that is graspable by an operator walking behind the machine, a locking mechanism locking the user-graspable portion of the handle at a desired height, and an actuator incorporated into the control. The control is actuated in a first direction to control the operational aspect of the power machine, and is actuated in a second direction to release the locking mechanism so the height of the user-graspable portion can be adjusted.

27 Claims, 6 Drawing Sheets

(56) References Cited

U.S. PATENT DOCUMENTS

| | | |
|---|---|---|
| 5,653,096 A | 8/1997 | Edwards |
| 5,816,614 A | 10/1998 | Kramer, Jr. et al. |
| 5,842,329 A | 12/1998 | Carter |
| 5,941,543 A | 8/1999 | Kazmark, Jr. |
| 6,098,492 A | 8/2000 | Juchniewicz et al. |
| 6,698,173 B2 * | 3/2004 | Joseph ........................... 56/16.7 |
| 6,832,670 B2 | 12/2004 | Wolters et al. |
| 7,231,755 B2 | 6/2007 | Clarke |
| D550,819 S | 9/2007 | Seehoff |
| 7,412,753 B2 | 8/2008 | Osborne et al. |
| 7,496,990 B2 * | 3/2009 | Qiao ............................... 16/437 |
| 7,975,359 B2 | 7/2011 | Osborne et al. |
| D652,190 S | 1/2012 | Slaton et al. |
| 2002/0084117 A1 | 7/2002 | Joseph |
| 2014/0102241 A1 | 4/2014 | Rao et al. |
| 2014/0190141 A1 | 7/2014 | Edholm et al. |

* cited by examiner

ADJUSTABLE HANDLE FOR OUTDOOR POWER EQUIPMENT

BACKGROUND

The present invention relates to a handle assembly for outdoor power equipment, the handle being adjustable to accommodate operators of different heights.

SUMMARY

In one embodiment, the invention provides a walk-behind outdoor power machine designed to accomplish work, the machine comprising: at least one surface engaging element for engaging a surface over which the machine travels; a frame supported by the surface engaging element; a prime mover supported by the frame; an implement supported by the frame and driven by the prime mover to accomplish the work; a control that is actuable to control at least one operational aspect of at least one of the surface engaging element, prime mover, and implement; a handle interconnected to the frame and extending upward, the handle including a user-graspable portion that is graspable by an operator walking behind the machine; a locking mechanism actuable between an engaged condition and a disengaged condition, the locking mechanism locking the user-graspable portion of the handle at a desired height when the locking mechanism is in the engaged condition, and permitting movement of the user-graspable portion of the handle when in the disengaged condition; and an actuator incorporated into the control for actuating the locking mechanism between the engaged condition and the disengaged condition.

In some embodiments, the control includes an operator presence switch that enables operation of the prime mover when moved in a first direction against the user graspable portion of the handle; and wherein the actuator includes a linkage interconnected between the control and the locking mechanism, such that the actuator moves the locking mechanism into the disengaged condition upon movement of the operator presence switch in a second direction opposite the first direction. In some embodiments, the handle includes at least one tubular portion; and wherein the actuator includes at least one cable within the tubular portion, the cable extending between and functionally interconnecting the control with the locking mechanism. In some embodiments, the user graspable portion of the handle is within an operator zone of the machine, the operator zone including all components of the machine accessible by an operator of the machine during operation of the machine. In some embodiments, the locking mechanism includes a receiving plate mounted to the frame and including at least one receiving aperture; wherein the locking mechanism further includes a retractable pin supported on the handle; wherein the locking mechanism is in the engaged condition when the retractable pin is received within the receiving aperture; and wherein the locking mechanism is in the disengaged condition when the locking pin is removed from the receiving aperture. In some embodiments, the actuator includes a cable interconnecting the control with the retractable pin; wherein actuation of the control moves the retractable pin into and out of the receiving aperture. In some embodiments, the retractable pin is biased into the receiving aperture. In some embodiments, the retractable pin is retractable into a tubular portion of the handle. In some embodiments, the handle is pivotably interconnected to the frame; and wherein the height of the user-graspable portion of the handle is adjusted by pivoting the handle with respect to the frame.

In some embodiments, the machine further comprises a pivot arm having first and second opposite ends, the pivot arm being pivotably mounted to the handle at a pivot point between the first and second opposite ends; wherein: the control includes a control cable interconnected between the first end of the pivot arm and a kill switch on the prime mover; the actuator includes an actuator cable interconnected between the second end of the pivot arm and the locking mechanism; actuation of the control in a first direction pivots the pivot arm in a first direction to apply tension to the control cable and disable the kill switch; and actuation of the control in a second direction opposite the first direction pivots the pivot arm in a second direction to apply tension to the actuator cable to move the locking mechanism into the disengaged condition.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
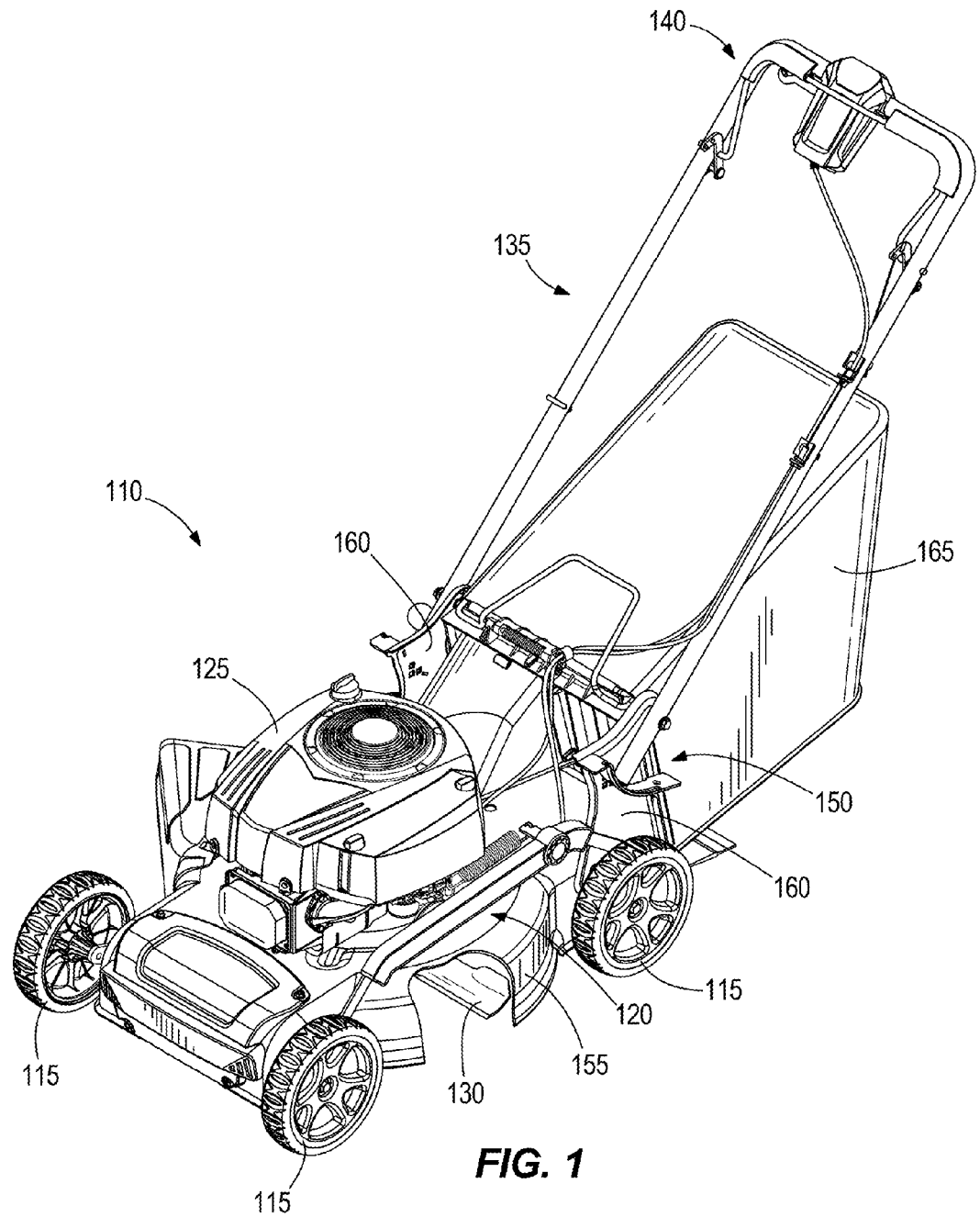
FIG. 1 is a perspective view of a walk-behind lawn mower embodying the invention.
Figure 2:
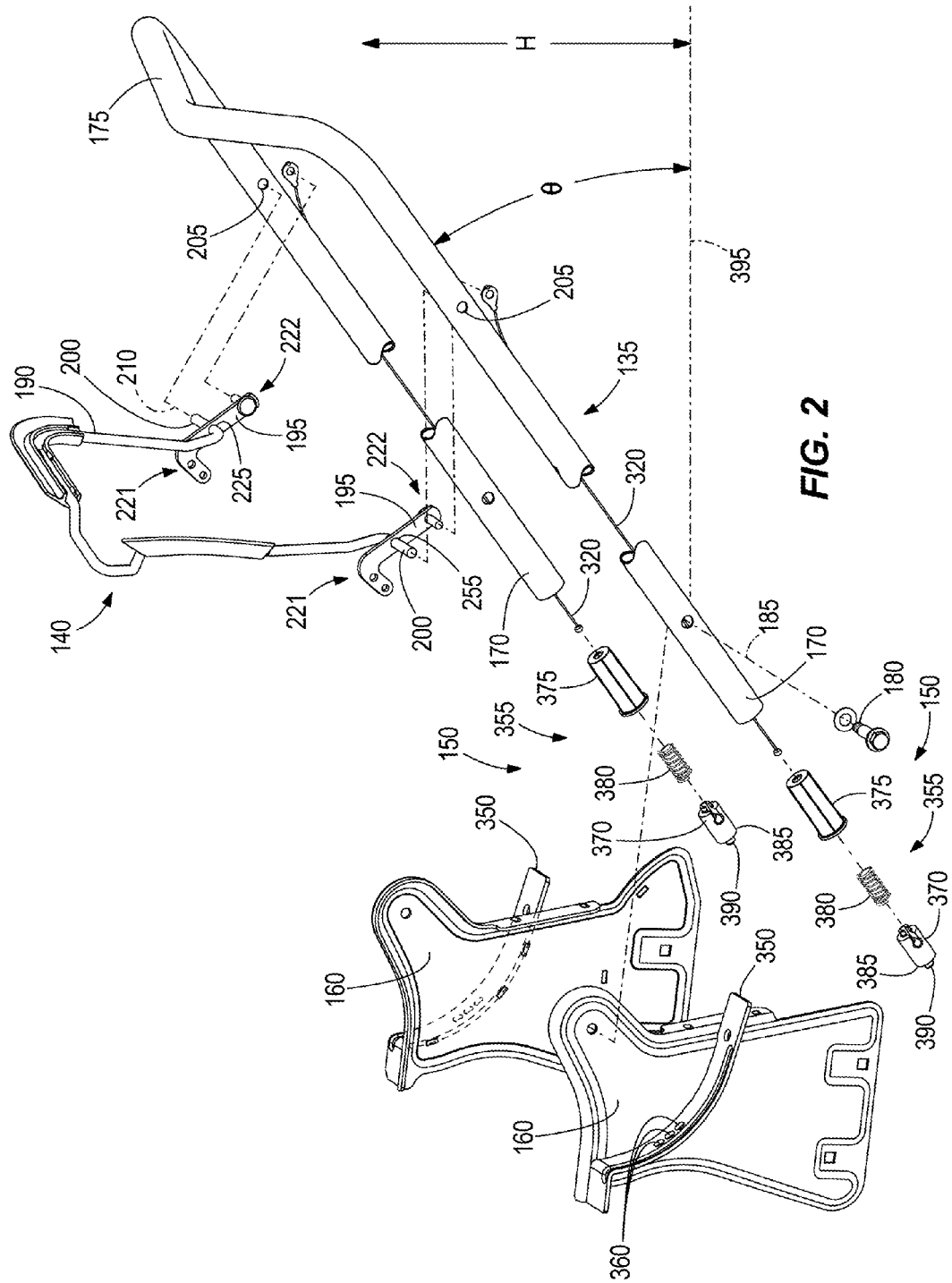
FIG. 2 is an exploded view of the handle assembly of the lawn mower.

FIGS. 1 and 2 illustrate a machine in the form of a walk-behind lawn mower 110 that includes, in addition to other components that will be discussed below, a plurality of wheels 115, a frame 120, an engine 125, a cutting blade 130, a handle 135, a bail assembly 140, and a handle locking mechanism 150. Although the illustrated machine is a walk-behind lawnmower, the invention can be applied to other power machines, such as walk-behind snow throwers and other power outdoor equipment having a handle where it is desirable to adjust the height of the handle to accommodate the operator.

The wheels 115 contact the ground and support the frame 120. The wheels 115 rotate with respect to the frame 120 on axles, so the lawn mower can roll over the ground with the frame 120 and cutting blade 130 held a desired height above the ground. Some walk-behind lawn mowers include powered wheels that are rotated under the influence of the engine 125, and other walk-behind lawn mowers require the operator to push the lawn mower 110. In other embodiments, the illustrated wheels 115 can be replaced with skids, tracks, or any other suitable surface engaging elements.

The frame 120 includes a cutting deck 155 and a pair of flanges 160 extending upwardly at the rear of the cutting deck 155. A bagging assembly 165 may be mounted to the flanges 160 as illustrated to collect clippings of grass or other vegetation being cut by the cutting blade 130. Also, as will be discussed below, the handle 135 is pivotably mounted to the flanges 160.

The engine 125 is mounted on top of the cutting deck 155 and includes an output shaft that extends down through the cutting deck 155. The illustrated engine 125 is a gasoline internal combustion engine, but in other embodiments it could be an electric motor or any other type of prime mover. The cutting blade 130 is mounted to or otherwise interconnected with the output shaft of the engine 125, and rotates with the output shaft under the cutting deck 155 to cut grass and other vegetation under the deck 155. In some embodiments, there may be multiple cutting blades 130 driven by the engine 125 under the cutting deck 155. The invention is not limited to a walk-behind lawn mower, but can also be embodied in power equipment that includes an implement other than a cutting blade, such as the auger and blower of a snow blower, or another implement driven by the prime mover to accomplish work.

The handle 135 is generally U-shaped and includes a pair of free ends 170 and a user-graspable portion 175 that an operator may grasp as the operator pushes the lawn mower 110. An operator zone may be defined as including all components of the machine accessible by an operator of the machine during operation of the machine while holding the user-graspable portion 175. The handle 135 may be comprised of several independent parts that are assembled or permanently connected together. The handle 135 is pivotably mounted to the frame 120 by way of pivot bolts 180 secured to the flanges 160. The pivot bolts 180 extend through the handle 135 near the free ends 170 to define a handle pivot axis 185, about which the handle 135 pivots with respect to the frame 120.

Figure 3:
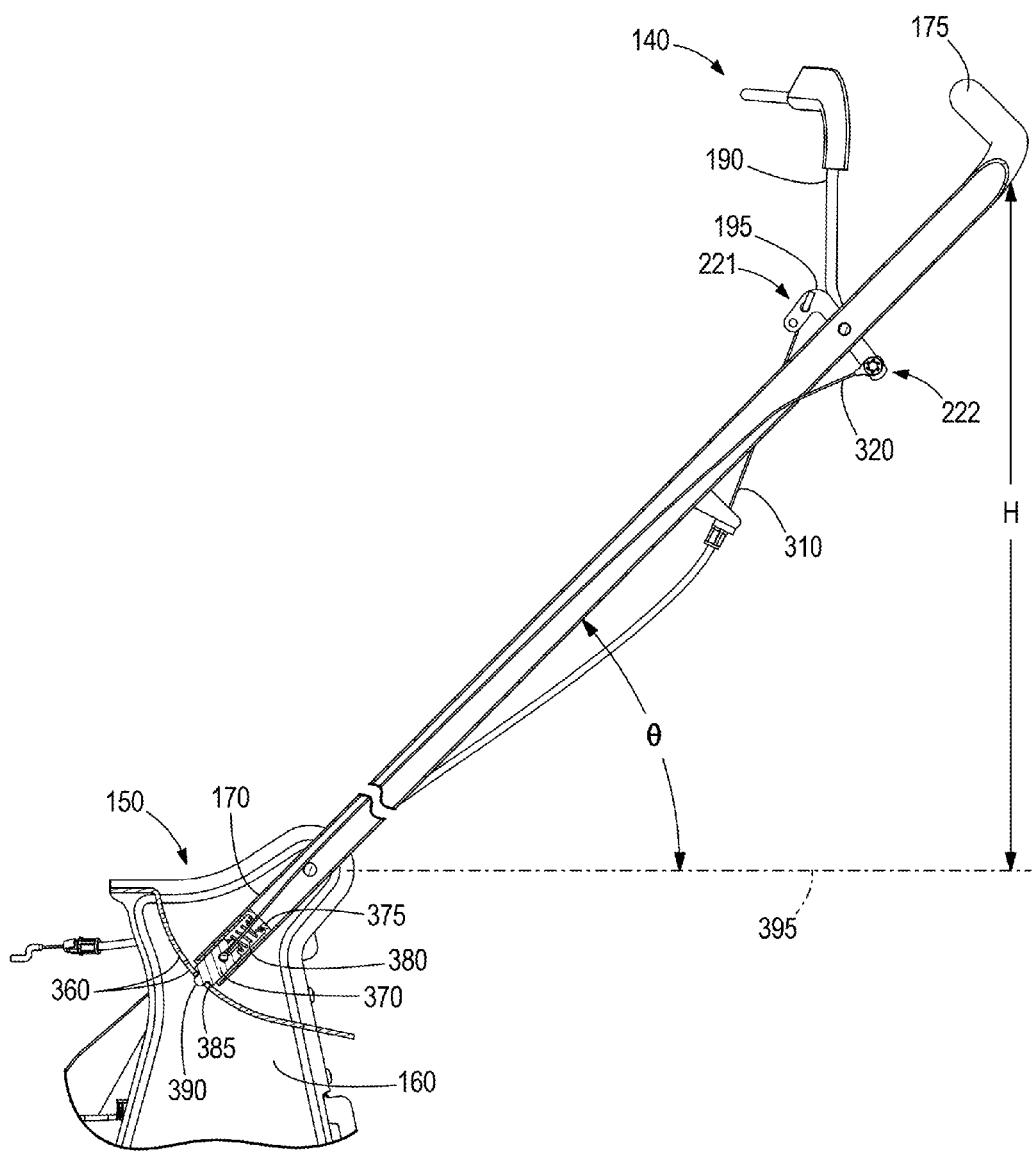
FIG. 3 is a cross section view of one side of the handle assembly of the lawn mower, showing the control handle in a neutral position.
Figure 4:
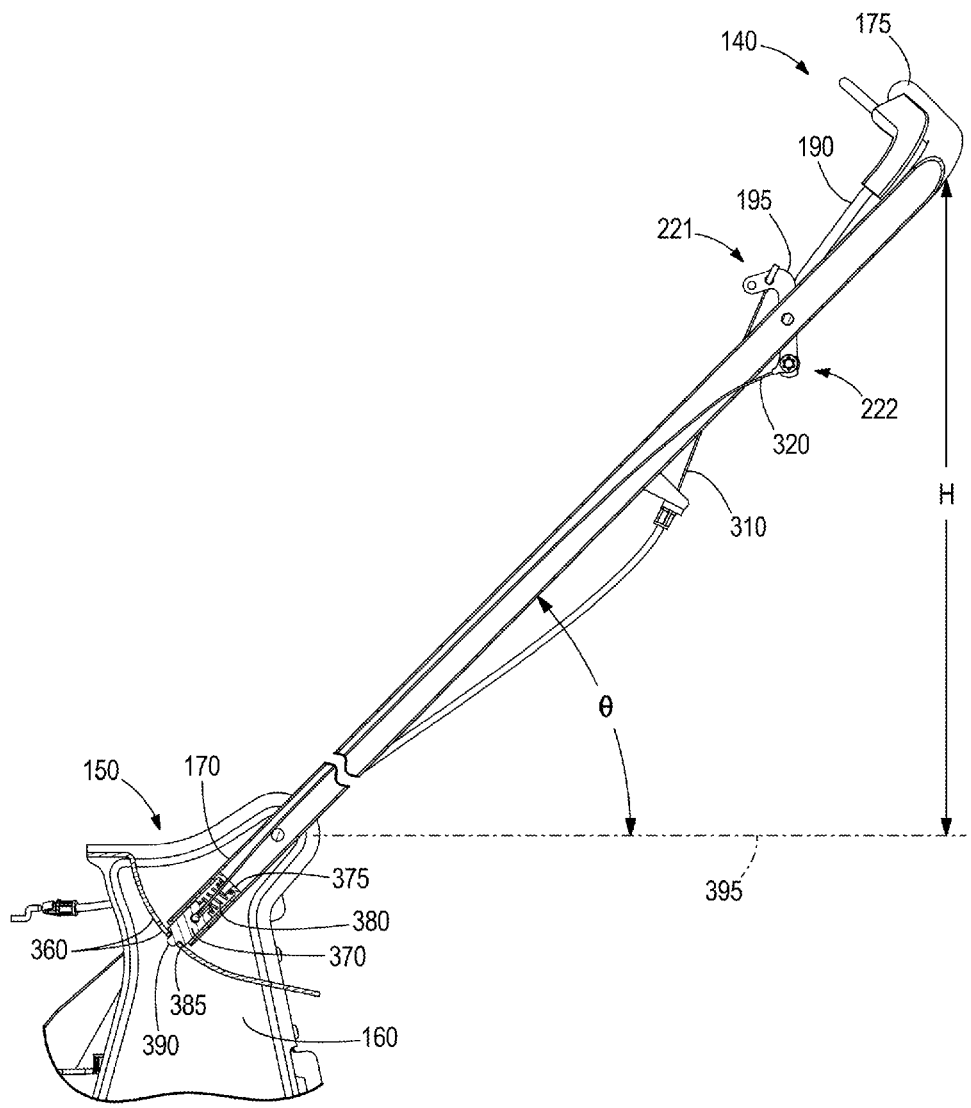
FIG. 4 is a cross section view of one side of the handle assembly of the lawn mower, showing the control handle in a first position in which the engine is enabled and the locking mechanism is engaged.

The bail assembly 140 is in the operator zone, and includes a bail 190 and a pair of pivot arms 195. The bail 190 is used to control at least one operational aspect of the lawn mower 110 and may therefore be referred to as a control. The bail 190 is generally U-shaped, and includes horizontal outwardly extending free ends 200. The free ends 200 of the bail 190 extend through bail pivot holes 205 in the handle 135 to define a bail pivot axis 210, about which the bail 190 pivots with respect to the handle 135. The bail 190 is biased into a neutral position, illustrated in FIG. 3, is pivotable toward the user graspable portion 175 of the handle 135 into a first position illustrated in FIG. 4, and is pivotable away from the user graspable portion 175 of the handle 135 into a second position illustrated in FIG. 5. Pivoting toward the first position can be referred to as pivoting in a first direction, and pivoting toward the second position can be referred to as pivoting in a second direction.

Each pivot arm 195 includes a first end 221, a second end 222, and a mounting point 225 between the first and second ends. The pivot arms 195 are rigidly mounted at the mounting point 225 to the bail 190 near the free ends 200. In this regard, the pivot arms 195 are pivotably mounted to the handle 135 at a mounting point 225 between the first and second opposite ends 221, 222. The mounting point 225 is also a pivot point about which the pivot arms 195 pivot with the bail 190. The mounting point 225 or pivot point is on the bail pivot axis 210, such that the pivot arms 195 pivot about the bail pivot axis 210 with the bail 190. The same convention for direction of pivoting the bail 190 can be applied to the pivot arms 195, which is to say that pivoting the bail 190 toward the first position results in pivoting the pivot arms 195 in a first direction, and pivoting the bail 190 toward the second position results in pivoting the pivot arm 195 in a second direction.

With reference to FIGS. 3-6, a control cable 310 is interconnected to the first end 221 of one of the pivot arms 195, and an actuator cable 320 is interconnected to the second end 222 of each pivot arm 195. In the illustrated embodiment, the control cable 310 is interconnected to an operator presence switch or a kill switch that is biased into a position that prevents a spark plug of the engine 125 from sparking, such that the engine 125 cannot operate. With the bail 190 in the neutral position, the kill switch is enabled and prevents the engine 125 from operating. When the bail 190 is pivoted to the first position, the control cable 310 actuates the operator presence switch (which may be the same as disabling the kill switch) to so that the engine 125 can operate until the bail 190 is released. In embodiments with other types of prime movers, the operator presence switch may be a different mechanism that disables the operation of the prime mover. In other embodiments or configurations, the control cable 310 may be interconnected with another component of the lawn mower, such as a clutch for causing rotation of the blade 130 or rotation of one or more of the wheels 115. In any event, actuation of the bail 190 or other control causes tension in the control cable 310 to control at least one operational aspect of the lawn mower 110, a component of the lawn mower 110, or of another type of power equipment.

The actuator cables 320 run from the second end 222 of each pivot arm 195 to the locking mechanism 150 on the same side of the handle 135. The actuator cables 320 may, as illustrated, be routed into the tubular side portions of the handle 135, such that a major portion of the actuator cables 320 is out of sight and contained within the tubular side portions. Tension is applied to the actuator cables 320 by pivoting the bail 190 to the second position. When pulled, the actuator cables 320 actuate the locking mechanism 150. In this regard, the bail 190 or other control on the lawn mower 110, is actuated in the first direction to control at least one operational aspect of the lawn mower 110 and is actuated in the second direction to actuate the locking mechanism 150. The actuator for the locking mechanism 150 may therefore be said to be incorporated into the bail 190 or other control, and the bail 190 or other control performs two functions. In other embodiments, one or both of the cables 310, 320 may operate in compression (i.e., pushing) than in tension (i.e., pulling).

Returning to FIG. 2, the locking mechanism 150 includes, on both sides of the lawn mower 110, a receiving plate 350 affixed to or integral with the flanges 160 and a retractable pin assembly 355. The receiving plates 350 extend generally sideways from the flanges 160. The receiving plates 350 are curved and generally follow the radius of curvature described by the free ends 170 of the handle 135 as they pivot about the handle pivot axis 185. The free ends 170 pivot in substantially constant proximity to the receiving plates 350. The receiving plates 350 include a plurality of receiving apertures 360. The receiving apertures 360 may be holes, bores (through-bores or blind bores), slots, detent grooves, or any other apertures, holes, bores, slots, grooves, openings, channels, or slots in the receiving plate 350, all of which can be generally referred to as receiving apertures 360. There are preferably a plurality of receiving apertures 360, corresponding to different heights of the user graspable portion 175 of the handle 135, as will be explained in more detail below.

The retractable pin assemblies 355 are within the tubular free ends 170 of the handle 135. Each retractable pin assembly 355 includes a pin 370, a cup 375, and a spring 380. The cup 375 is positioned within the end 170 of the handle 135 and contains the spring 380 and the pin 370. The pin 370 can be displaced into the cup 375 against the biasing force of the spring 380. The spring 380 linearly biases and displaces the pin 370 out of the handle end 170. The pin 370 includes a shoulder 385 and smaller pin head 390. The shoulder 385 engages the receiving plate 350 and the pin head 390 is received in the receiving apertures 360.

The pins 370 are normally extended into an engaged condition with respect to the receiving plate 350, in which the pins 370 are received within the receiving aperture 360. The pins 370 are biased into the engaged condition under biasing forces of the springs 380. When aligned with a receiving aperture 360 in the receiving plate 350, the pin 370 (specifically, the pin head 390 in the illustrated embodiment) extends into the receiving aperture 360 and locks the handle 135 against pivoting on the handle pivot axis 185 and thereby locks the user-graspable portion 175 at a desired height. When the pins 370 are retracted from the receiving aperture 360 (i.e., at least partially into the tubular free ends 170 of the handle 135 and in a disengaged condition with respect to the receiving plates 350 and receiving apertures 360), the handle 135 is free to pivot about the pivot bolts 180 and the handle pivot axis 185. The pins 370 are retracted into the free end 170 of the handle 135 against the biasing force of the spring 375 under influence of tension in the actuator cable 320. Consequently, when the bail 190 is pivoted to the second position and the pivot arms 195 pivot in the second direction, tension is applied to the actuator cables 320 on both sides of the handle 135, and the pins 370 at the free ends 170 of the handles 135 are retracted from the receiving apertures 360. The pivot handles 195 and actuator cables 320 may be referred to as a linkage interconnected between the control 190 and the locking mechanism 150.

Figure 5:
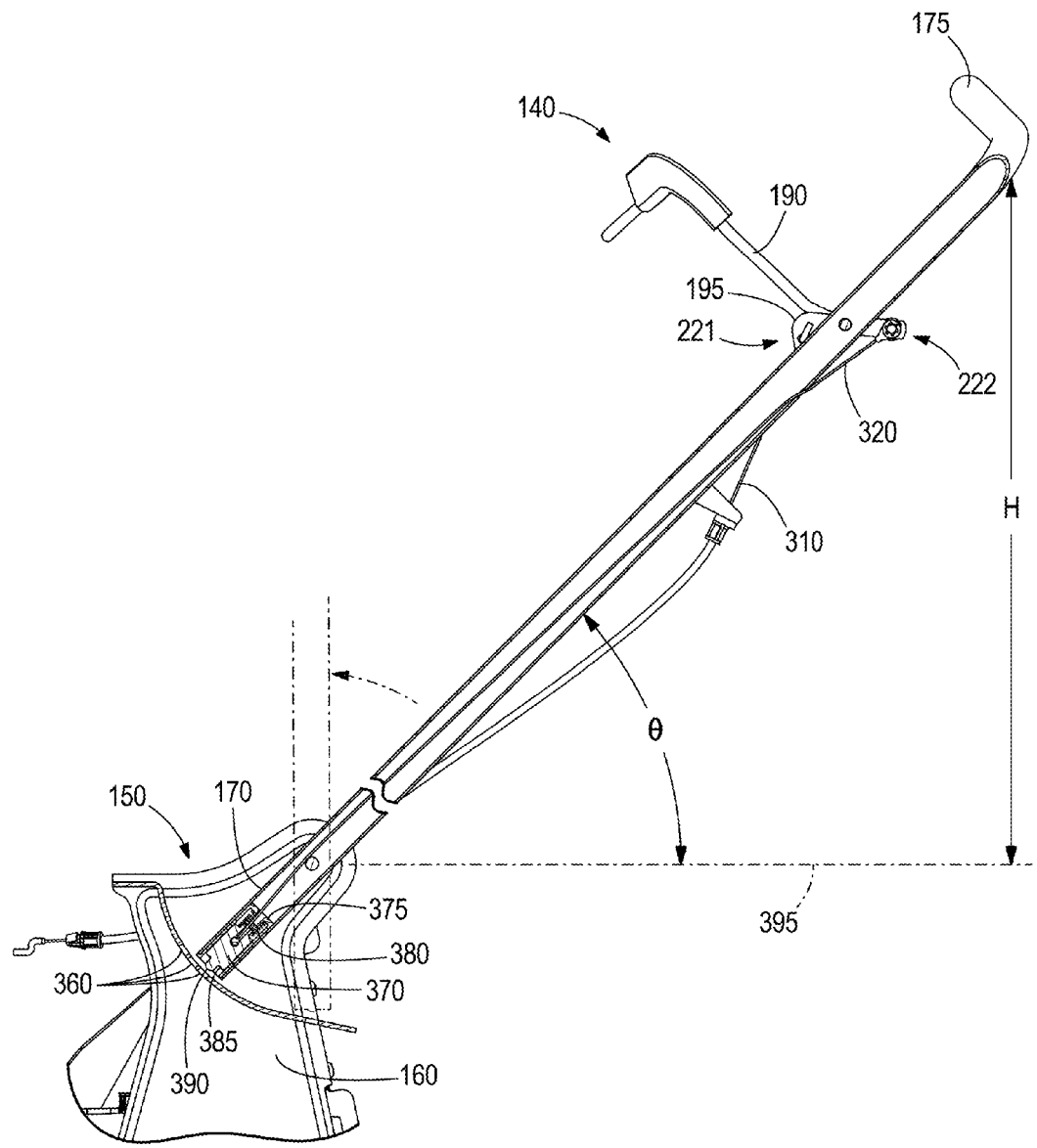
FIG. 5 is a cross section view of one side of the handle assembly of the lawn mower, showing the control handle in a second position in which the engine is disabled and the locking mechanism is disengaged.
Figure 6:
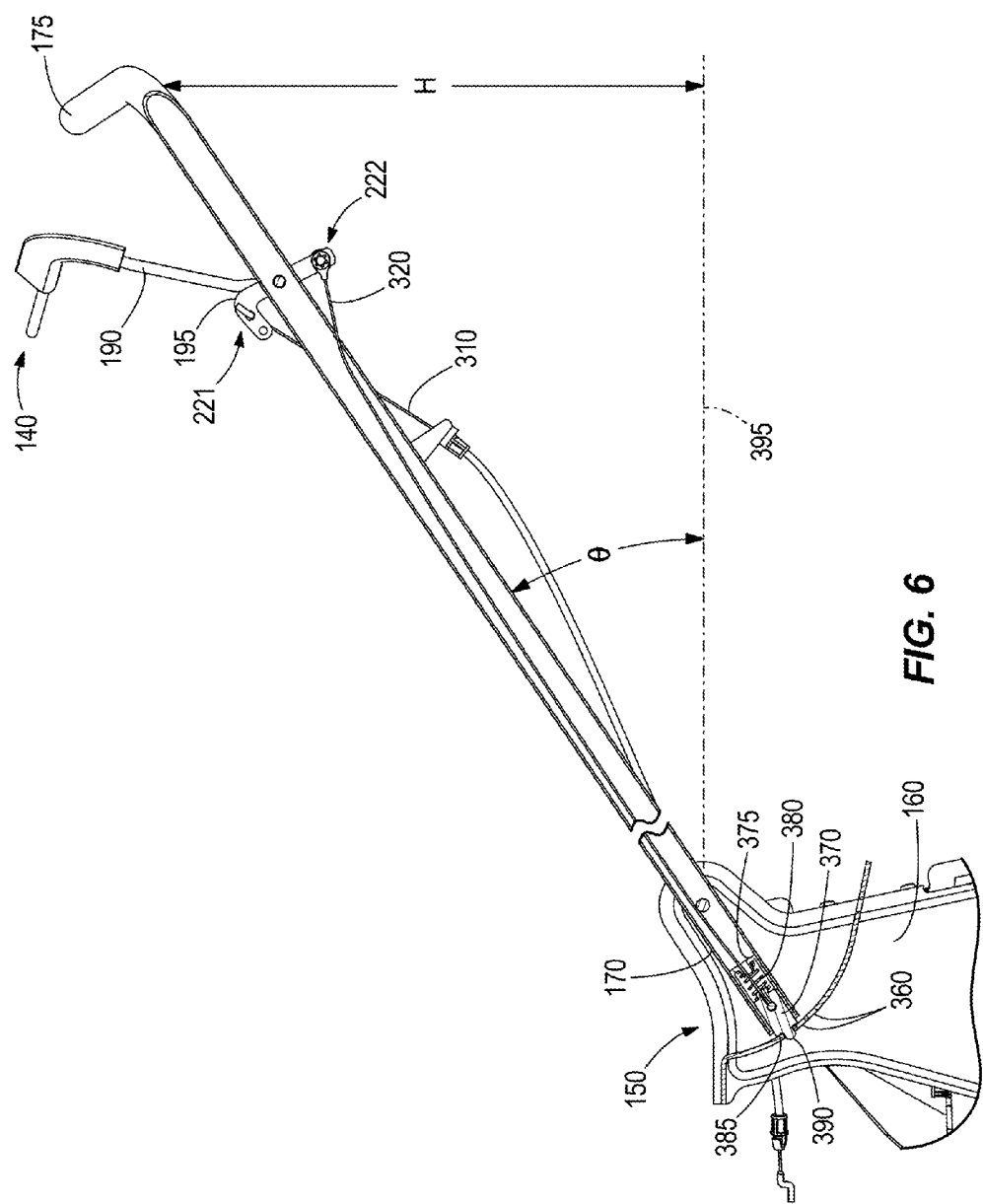
FIG. 6 is a cross section view of one side of the handle assembly, with the handle at a new height.

In operation, the operator holds the bail 190 in the first position (FIG. 4) against the user graspable portion 175 of the handle 135 while operating the lawn mower 110. When the bail 190 is released, the bail 190 returns to the neutral position (FIG. 3) and the engine 125 ceases to operate. If the operator wishes to fold the handle 135 into a storage position (pivoted forward across the mower deck 155) or if the operator wishes to adjust the height of the user-graspable portion 175, the operator pushes the bail 190 into the second position (FIG. 5). This pivots the pivot arms 195, which retracts the pins 370 by way of the actuator cables 320. With the bail 190 held in the second position, the handle 135 can be pivoted into the storage position or pivoted so that the free ends 170 of the handle 135 align with different receiving apertures 360. When the pins 370 are aligned with receiving apertures 360 and the bail 190 is released, the springs 380 urge the pins 370 into engagement with the apertures 360 to resist pivoting of the handle 135.

The handle 135 extends up from the handle pivot axis 185 at a handle angle θ with respect to a plane 395 parallel to the surface on which the lawn mower 110 sits (nominally, a horizontal plane). The height H of the user graspable portion 175 is equal to the sine of the handle angle θ, multiplied by the length of the handle 135 from the pivot axis 185 to the user graspable portion 175. The height H is greater in FIG. 4 than in FIG. 6, because the pins 370 are received in different receiving apertures 360. Because the handle pivot axis 185 is above the free ends 170, pivoting the user graspable portion 175 down corresponds to pivoting the free ends 170 up, and vice versa. The user graspable portion 175 is higher in FIG. 4 than in FIG. 6, but the free ends 170 are lower, and the pin 370 engages a lower receiving aperture 360.

Thus, the invention provides, among other things, a mechanism for adjusting the height of the user graspable portion of a handle on a piece of outdoor power equipment. Various features and advantages of the invention are set forth in the following claims.

What is claimed is:

1. A walk-behind outdoor power machine designed to accomplish work, the machine comprising:
    at least one surface engaging element for engaging a surface over which the machine travels;
    a frame supported by the surface engaging element;
    a prime mover supported by the frame;
    an implement supported by the frame and driven by the prime mover to accomplish the work;
    a control that is actuable to control at least one operational aspect of at least one of the surface engaging element, prime mover, and implement;
    a handle interconnected to the frame and extending upward, the handle including a user-graspable portion that is graspable by an operator walking behind the machine;
    a locking mechanism actuable between an engaged condition and a disengaged condition, the locking mechanism locking the user-graspable portion of the handle at a desired height when the locking mechanism is in the engaged condition, and permitting movement of the user-graspable portion of the handle when in the disengaged condition; and
    an actuator incorporated into the control for actuating the locking mechanism between the engaged condition and the disengaged condition.

2. The machine of claim 1, wherein the control includes an operator presence switch that enables operation of the prime mover when moved in a first direction against the user graspable portion of the handle; and wherein the actuator includes a linkage interconnected between the control and the locking mechanism, such that the actuator moves the locking mechanism into the disengaged condition upon movement of the operator presence switch in a second direction opposite the first direction.

3. The machine of claim 1, wherein the handle includes at least one tubular portion; and wherein the actuator includes at least one cable within the tubular portion, the cable extending between and functionally interconnecting the control with the locking mechanism.

4. The machine of claim 1, wherein the user graspable portion of the handle is within an operator zone of the machine, the operator zone including all components of the machine accessible by an operator of the machine during operation of the machine.

5. The machine of claim 1, wherein the locking mechanism includes a receiving plate mounted to the frame and including at least one receiving aperture; wherein the locking mechanism further includes a movable member supported on the handle; wherein the locking mechanism is in the engaged condition when the movable member is received within the receiving aperture; and wherein the locking mechanism is in the disengaged condition when the movable member is removed from the receiving aperture.

6. The machine of claim 5, wherein the actuator includes a cable interconnecting the control with the movable member; wherein actuation of the control moves the movable member into and out of the receiving aperture.

7. The machine of claim 5, wherein the movable member is biased into the receiving aperture.

8. The machine of claim 5, wherein the movable member includes a retractable pin that is retractable into a tubular portion of the handle.

9. The machine of claim 1, wherein the handle is pivotably interconnected to the frame; and wherein the height of the user-graspable portion of the handle is adjusted by pivoting the handle with respect to the frame.

10. The machine of claim 1, further comprising a pivot arm having first and second opposite ends, the pivot arm being pivotably mounted to the handle at a pivot point between the first and second opposite ends; wherein:
   the control includes a control cable interconnected between the first end of the pivot arm and a kill switch on the prime mover;
   the actuator includes an actuator cable interconnected between the second end of the pivot arm and the locking mechanism;
   actuation of the control in a first direction pivots the pivot arm in a first direction to apply tension to the control cable and disable the kill switch; and
   actuation of the control in a second direction opposite the first direction pivots the pivot arm in a second direction to apply tension to the actuator cable to move the locking mechanism into the disengaged condition.

11. The machine of claim 9, wherein the handle is pivotable relative to the frame between a first handle position, in which the handle extends at an oblique angle with respect to a plane that is parallel to the surface on which the machine travels, and a second handle position, in which the handle extends generally perpendicular with respect to the plane.

12. The machine of claim 11, wherein the handle is pivotable relative to the frame to a third handle position, in which the handle extends at a different oblique angle with respect to the plane.

13. The machine of claim 1, wherein the control is movable in a first direction to control the at least one operational aspect, and is movable in a second direction opposite the first direction to disengage the locking mechanism.

14. The machine of claim 13, wherein the control pivots with respect to the handle in the first and second directions.

15. The machine of claim 1, wherein the control is movable between a neutral position, a first position to control the at least one operational aspect, and a second position to disengage the locking mechanism.

16. The machine of claim 15, wherein the control is biased to the neutral position.

17. The machine of claim 15, wherein the control is pivotable between the neutral position, the first position, and the second position.

18. The machine of claim 15, wherein the control is movable from the neutral position in a first direction toward the first position, and is movable from the neutral position in a second direction that is different than the first direction toward the second position.

19. A walk-behind lawn mower comprising:
   a plurality of wheels;
   a frame supported by the plurality of wheels, the frame including a cutting deck;
   a prime mover supported by the frame;
   a cutting blade supported by the frame and driven by the prime mover;
   a handle pivotally connected to the frame, the handle including a user-graspable portion that is graspable by an operator walking behind the lawn mower;
   a locking mechanism actuable between an engaged condition and a disengaged condition, the locking mechanism securing the handle relative to the frame when in the engaged condition, and permitting movement of the handle relative to the frame when in the disengaged condition; and
   a control that is actuable to control the cutting blade and the locking mechanism.

20. The walk-behind lawn mower of claim 19, wherein the control is supported by the handle adjacent the user-graspable portion.

21. The walk-behind lawn mower of claim 19, wherein the control is movable in a first direction to drive the cutting blade, and is movable in a second direction that is different than the first direction to disengage the locking mechanism.

22. The walk-behind lawn mower of claim 21, wherein the control includes a generally U-shaped bail that is movable from a neutral position in the first direction to drive the cutting blade, and is movable from the neutral position in a second direction to disengage the locking mechanism.

23. The walk-behind lawn mower of claim 21, further comprising:
   a control cable interconnected between the control and a kill switch on the prime mover, and
   an actuator cable interconnected between the control and the locking mechanism,
   wherein actuation of the control in the first direction applies tension to the control cable to disable the kill switch, and wherein actuation of the control in the second direction applies tension to the actuator cable to move the locking mechanism into the disengaged condition.

24. The walk-behind lawn mower of claim 19, wherein the handle is pivotable relative to the frame between a first handle position, in which the handle extends at a first oblique angle with respect to a plane that is parallel to a surface on which the lawn mower sits, and a second handle position, in which the handle extends generally perpendicular with respect to the plane.

25. The walk-behind lawn mower of claim 24, wherein the handle is pivotable relative to the frame to a third handle position, in which the handle extends at a different oblique angle with respect to the plane.

26. The walk-behind lawn mower of claim 19, wherein the locking mechanism includes
   a receiving plate mounted to the frame and defining a plurality of receiving apertures, and
   a movable member supported on the handle and coupled to the control for movement relative to the receiving plate,
   wherein the locking mechanism is in the engaged condition when the movable member is received within one of the plurality of receiving apertures, and wherein the locking mechanism is in the disengaged condition when the movable member is removed from the plurality of receiving apertures.

27. A walk-behind lawn mower comprising:
   a plurality of wheels;
   a frame supported by the plurality of wheels, the frame including a cutting deck;
   a prime mover supported by the frame, the prime mover including a kill switch;
   a cutting blade supported by the cutting deck and driven by the prime mover;
   a handle pivotally connected to the frame, the handle including a user-graspable portion that is graspable by an operator walking behind the lawn mower;
   a generally U-shaped bail supported by the handle adjacent the user-graspable portion;
   a locking mechanism including a receiving plate mounted to the frame and defining a plurality of receiving apertures, a movable member supported on the handle and movable between an engaged condition, in which the movable member extends into one of the plurality of receiving apertures, and a disengaged condition, in which the movable member is removed from the plurality of receiving apertures, and a spring coupled to the movable member to bias the movable member toward the engaged position;

a control cable interconnected between the bail and the kill switch on the prime mover, wherein actuation of the bail in a first direction tensions the control cable to disable the kill switch; and an actuator cable interconnected between the bail and the movable member, wherein actuation of the bail in a second direction opposite the first direction tensions the actuator cable to move the movable member against the bias of the spring to the disengaged condition.

* * * * *